Patented June 16, 1925.

1,542,513

UNITED STATES PATENT OFFICE.

RALPH H. McKEE, OF NEW YORK, N. Y., ASSIGNOR TO INTARVIN COMPANY, OF NEW YORK, N. Y., A CORPORATION OF NEW YORK.

PRODUCTION OF ESTERS OF FATTY ACIDS.

No Drawing.   Application filed March 28, 1923.   Serial No. 628,371.

*To all whom it may concern:*

Be it known that I, RALPH H. McKEE, a citizen of the United States, residing at New York, in the county of New York and State of New York, have invented certain new and useful Improvements in the Production of Esters of Fatty Acids, of which the following is a specification.

This invention relates to the production of esters of fatty acids, and more particularly to the production of glycol esters of fatty acids.

More specifically, the invention relates to the production of the glycol esters of fatty acids of odd-number carbon atoms of high molecular weight, the carbon content of which ranges from $C_{11}$ to $C_{19}$. In a copending application of Max Kahn, filed November 19, 1921, Serial No. 516,321, now Patent No. 1,455,254, granted May 15, 1923, there is described and claimed a material particularly suitable for use in treating diabetes and combating acidosis, consisting of glycerine esters of fatty acids of odd-number carbon atoms ranging from $C_{11}H_{22}O_2$ to $C_{19}H_{38}O_2$. It has been found that these fats and acids in their natural condition have a melting point above the temperature of the human body and for ease of digestion, it is desirable that this melting point be lowered.

In a copending application of Harold O. Nolan, filed May 18, 1923, Serial No. 639,972, there is described and claimed a material consisting primarily of a fat or fatty acid of the general type disclosed in the Kahn application having a small portion of a tasteless petroleum oil added thereto for the purpose of lowering the melting point of the product to a temperature slightly below the normal temperature of the human body. I have found that the melting temperature of these fatty acids of odd-number carbon atoms and high molecular weight may be lowered by esterifying them. I have also discovered that the glycol esters of the fatty acids have lower melting points than the glycerine esters of the corresponding acids and are thus more suitable for use as food for diabetics. Glycol is harmless when taken internally even in large amounts (see Curme & Young, Chemical and Metallurgical Engineering, vol. 28, page 169), and may thus be added to a food product without producing harmful effects.

In addition to the glycol esters of these acids, I have found that the ethyl esters of the odd-number carbon atom fatty acids also have relatively low melting points and are particularly suitable for use in combating diabetes and acidosis.

The esters are prepared in any suitable manner, employing the same esterifying processes now employed in the production of esters of the fatty acids of even-number carbon content. The fatty acids are first prepared synthetically and are then esterified with glycol by heating to a temperature of approximately 150° C., in a current of carbon dioxid or in a vacuum. As described and claimed in my copending application Serial No. 628,372, filed March 28, 1923, the speed of esterification can be increased and the temperature required may be lowered by employing a small amount of one of the Twitchell reagents as a catalyst during the process. The ester produced is washed with warm water to remove any excess of glycol or other alcohol and also to remove the catalytic reagent.

The ethyl ester is prepared in substantially the same manner, ethyl alcohol being employed in place of the glycol.

The product obtained in either instance is used as a food and has the advantage over the use of the corresponding fatty acid or the glycerine ester in that a material of lower melting point is obtained which assists in the digestion of the food.

While I have described in detail the preferred practice of my process, it is to be understood that the details of procedure may be widely varied without departing from the spirit of the invention or the scope of the subjoined claims.

Having thus described my invention, I claim:

1. An artificial food product for use in treating diabetes and acidosis comprising a dihydroxy-alcohol ester of a fatty acid of odd-number carbon atoms of high molecular weight having a melting point below the melting point of the fatty acid.

2. An artificial food product for use in treating diabetes and acidosis comprising a glycol ester of a fatty acid of odd-number carbon atoms of high molecular weight.

3. An artificial food product for use in treating diabetes and acidosis comprising an ester of an alcohol having less than three carbon atoms and a fatty acid of odd-number carbon atoms of high molecular weight having a melting point below the melting point of the fatty acid.

In testimony whereof I affix my signature in presence of two witnesses.

RALPH H. McKEE.

Witnesses:
L. V. EATON,
EARLE H. MORSE.